United States Patent [19]

Ristuccia et al.

[11] 4,324,961

[45] Apr. 13, 1982

[54] DISTRIBUTION TRANSFORMER HAVING A PRIMARY DISCONNECT SWITCH

[75] Inventors: Donald J. Ristuccia; John F. Cotton, both of Athens, Ga.

[73] Assignee: Westinghouse Electric Corp., Pittsburgh, Pa.

[21] Appl. No.: 12,918

[22] Filed: Feb. 16, 1979

Related U.S. Application Data

[63] Continuation of Ser. No. 687,479, May 18, 1976, abandoned.

[51] Int. Cl.[3] .................... H01H 33/68; H01H 75/00; H02H 7/04

[52] U.S. Cl. ................................ 200/150 R; 200/145; 335/6; 337/6

[58] Field of Search ........... 200/144 R, 146 R, 146 A, 200/146 AA, 150 R, 145, 16 R, 16 A, 84 R; 335/6, 9, 15, 16, 21, 23, 194; 337/6

[56] References Cited

U.S. PATENT DOCUMENTS

| | | | |
|---|---|---|---|
| 1,783,731 | 12/1930 | Leppert | 200/145 |
| 2,043,530 | 6/1936 | Dezotell | 200/84 R |
| 2,765,383 | 10/1956 | Cooper et al. | 200/150 R |
| 3,979,704 | 9/1976 | Buckley et al. | 335/6 |
| 3,983,454 | 9/1976 | Cotton et al. | 335/6 |

*Primary Examiner*—Robert S. Macon

*Attorney, Agent, or Firm*—Robert E. Converse, Jr.

[57] ABSTRACT

An oil-filled distribution transformer having a primary disconnect switch disposed within the housing and utilizing two movable bridging contacts and four stationary contacts for completing a series circuit therethrough. The switch includes a trip mechanism, a bimetal element isolated from the current path through the switch and responsive to the temperature of the oil to activate the trip mechanism upon overtemperature condition, and a float mechanism attached to the switch and cooperating with the trip mechanism so that the float assembly will activate the trip mechanism when the oil level within the housing drops below a predetermined value.

10 Claims, 4 Drawing Figures

DISTRIBUTION TRANSFORMER HAVING A PRIMARY DISCONNECT SWITCH

This is a continuation of application Ser. No. 687,479, filed May 18, 1976 now abandoned.

BACKGROUND OF THE INVENTION

1. Field of the Invention

This invention relates to distribution transformers and, more particularly, to distribution transformers having high voltage primary disconnect switches to provide isolation of the transformer from the high voltage input circuit.

2. Description of the Prior Art

Oil-filled transformers are used in power distribution systems to transform electrical power from a high voltage suitable for use in transmission to lower voltages suitable for distribution and use within a customer's premises. Repair and maintenance operations often require that the transformer and associated components be isolated from the high voltage transmission circuit serving as input to the transformer. In order to provide this isolation a high voltage disconnect switch is provided. This switch is electrically inserted between the primary coil of the transformer and the high voltage bushing through which the high voltage primary circuit enters the transformer housing. The switch must be constructed so as to minimize the possibility of flashover arcing between components at high potential and other transformer components at ground potential. Thus, the components of the switch must be designed to provide sufficient physical separation between these components.

In dealing with the problem of maintaining sufficient insulation and isolation for switch components, some prior art switches employed plastic operating and support components. Insuring that the dimensions of the components will be held to necessary close tolerances requires extremely accurate molding. In addition, the hot oil environment in which the switch must function is less than ideal for even the best plastic materials. Since metal components having the required tolerances and ability to operate efficiently under hot oil are lower in cost than plastic components meeting similar requirements, it is desirable to provide a switch having metal components which will not result in flashover problems.

The space within the housing of the transformer is limited. Therefore, it is desirable to provide a high voltage switch which is compact in size yet will maintain the required isolation between high voltage components and grounded components.

Since interruption of a high voltage circuit can cause severe problems if the resulting arc persists for an extended length of time, it is important to attempt to extinguish the arc as rapidly as possible. One method for doing this is to insure that the contacts will be below the oil level within the transformer housing whenever the switch is opened. The oil provides cooling of the arc and other properties well known in the art to provide for rapid arc extinction.

If the oil level within the transformer housing should fall below the level of the high voltage disconnect switch contacts, opening of these switch contacts at this time will cause an arc to be drawn within the vapor-filled region above the oil level. This in turn can result in a catastrophic failure of the transformer due to ignition of the oil vapor by the arc. Therefore, it would be desirable to provide means for detecting a low level of oil within the transformer housing and automatically opening the switch contacts before the oil can drop below the level of the contacts.

SUMMARY OF THE INVENTION

An oil-filled transformer has a high voltage disconnect switch disposed within a transformer housing. The disconnect switch includes a metal base and a plurality of stationary contacts, one of which is connected to the high voltage incoming feeder line and one of which is connected to the primary coil of the transformer. The switch also includes a plurality of bridging contacts operable between an open position spaced away from the stationary contacts and a closed position bridging the stationary contacts to complete a series circuit from the high voltage transmission line to the primary coil of the transformer. The bridging contacts are insulatingly mounted upon elongated metal contact arms which are movably attached to a metal operating mechanism supported upon the switch base. The operating mechanism includes means operable upon actuation to automatically move the contact arm and bridging contacts from the closed position to the open position. Means are provided which are isolated from the current carrying portions of the switch and are responsive to the temperature of the surrounding oil, the temperature responsive means causing the switch mechanism to automatically move the bridging contacts from the closed to the open positions whenever the temperature of the oil rises above a predetermined level. A float mechanism is attached to the high voltage switch for monitoring the level of oil within the transformer housing. When the oil level drops below a predetermined level, the float mechanism causes the operating mechanism of the switch to automatically operate the bridging contacts from the closed to the open position.

By providing a plurality of stationary contacts and a plurality of bridging contacts, a plurality of arcs are produced when the switch is operated from the closed to the open position. This minimizes the volume required for a switch capable of interrupting a high voltage circuit. Since the movable bridging contacts are insulated from the contact arm and the stationary contacts are insulated from the base, the majority of switch components are formed from metal, thereby reducing the cost of close tolerance components suitable for use in a hot oil environment.

The disclosed transformer thus has many advantages over the prior art. The use of a maximum of metallic parts throughout the transformer provides a high degree of dimensional stability throughout the required service range at a minimum of cost. The use of multiple stationary contacts and multiple bridging contacts to produce a plurality of arcs during an opening operation provides a compact switch capable of interrupting a high voltage in a minimum of volume. Automatic interruption is provided under conditions of either a high temperature within the transformer housing or a low oil level within the housing. The above advantages are provided with a high degree of cost efficiency.

BRIEF DESCRIPTION OF THE DRAWINGS

For a better understanding of this invention, reference may be had to the preferred embodiment of the invention which is shown in the accompanying drawings, in which.

DESCRIPTION OF THE PREFERRED EMBODIMENT

Figure 1:
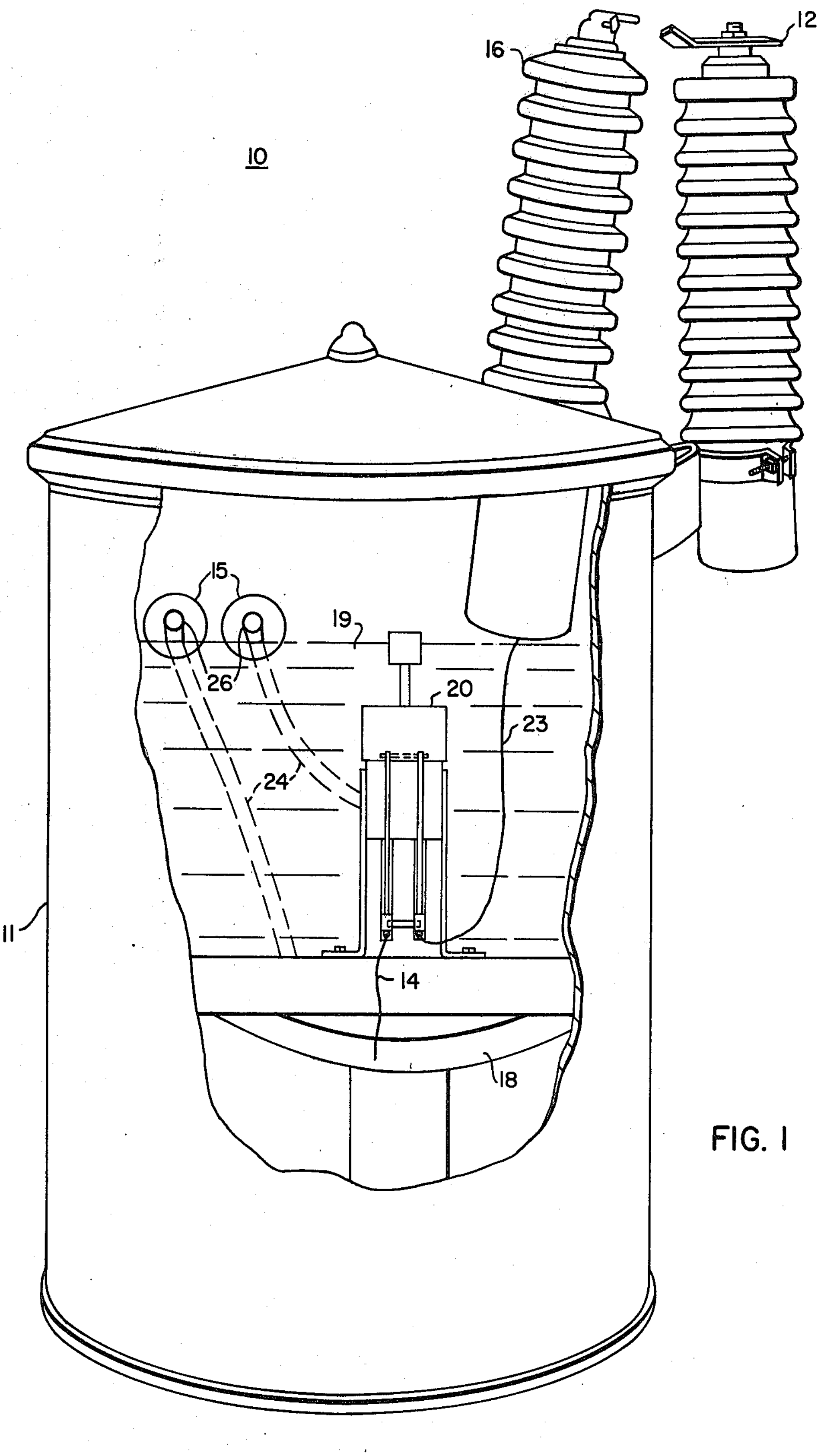
FIG. 1 is a perspective view of an oil filled distribution transformer utilizing the teaching of the present invention.

Referring now to the drawings and FIG. 1, in particular, there is shown a pole-type distribution transformer 10 including a high voltage disconnect switch 20 utilizing the teaching of the present invention. The transformer 10 includes an enclosure or housing 11 with a lightning arrester 12 and a primary high voltage bushing 16 mounted thereon. Secondary bushings, such as low voltage bushings 15, are attached to the housing 11 to which the transformer load is connected. A core and coil assembly 18 is secured inside the housing 11. A primary winding lead 14 extends from the primary coil of the assembly 18 to the switch 20. A lead 23 connects the switch 20 to the high voltage bushing 16. The enclosure 11 is partially filled with an insulating liquid dielectric 19, such as transformer oil. The switch 20 and the core and coil assembly 18 are immersed in the insulating oil 19. Conductors 24 connect the secondary coil of the transformer to the low voltage bushings 15 mounted upon the transformer housing 11. Appropriate loads can then be connected to the low voltage terminals 26 of the distribution transformer 10.

Figure 2:
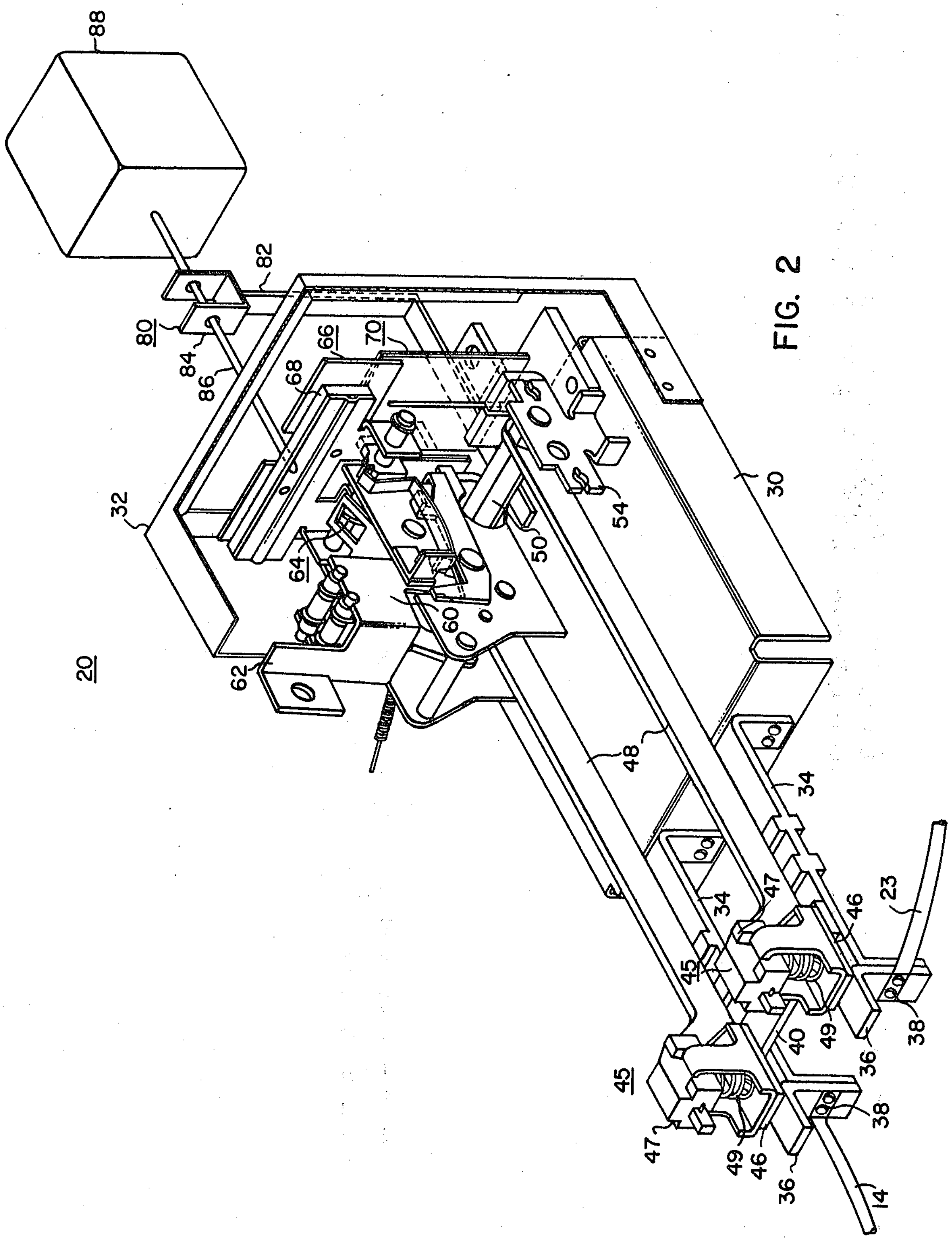
FIG. 2 is a perspective view of a high voltage disconnect switch for use in a distribution transformer utilizing the teaching of the present invention.

FIG. 2 is a perspective view of the high voltage primary disconnect switch 20 utilizing the teaching of the present invention. The switch 20 is mounted upon a metallic base 30. A cover 32 is provided partially surrounding the sensing and tripping elements of the circuit breaker 20 to provide protection during handling. Contact support members 34 of insulating material such as arc quenching plastic are attached to the metallic base 30. Stationary contacts 36 are mounted upon the ends of the contact support members 34 and are electrically connected to terminals 38 for attachment of leads 23 and 14 leading to the high voltage bushing 16 and the primary coil 26 of the transformer. An additional stationary contact or bar member 40 is mounted across the two contact support members 34, and positioned between the stationary contacts 36 and the metallic base 30. Alternatively, two separate contacts connected by a conducting shunt could be used in place of the contact 40.

Figure 4:
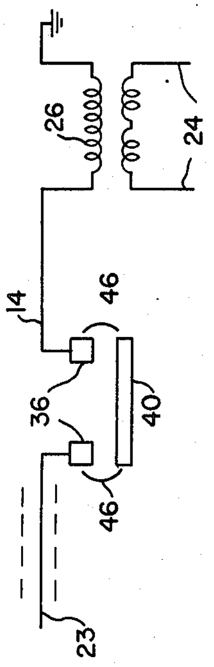
FIG. 4 is an electrical schematic diagram of the high voltage disconnect switch.

Two bridging contacts 46 are provided which, with the switch in the closed position, complete a series circuit from the incoming high voltage primary leads 23 to the first stationary contact 36, the first bridging contact 46, the bar member 40, the second bridging contact 46, the second stationary contact 36, the lead 14, and the primary transformer coil 26. The electrical relationship of the various contacts and components can be seen more clearly in FIG. 4, which is a schematic diagram of the circuit. Thus, with the switch 20 in a closed position, high voltage is supplied to the primary coil 26 of the transformer 10.

The bridging contacts 46 are part of bridging contact assemblies 45 which also include insulators 47 and springs 49. The bridging contact assemblies 45 are attached to elongated metal contact arms 48, the other end of which are rigidly secured to a shaft 50. The shaft 50 which can be a metallic member, connects the elongated contact arms 48 with an operating mechanism 60 for simultaneous movement. The spring 49 provides uniform contact pressure and proper seating of the bridging contacts 46 on the stationary contacts 36 and 40.

The shaft 50 is rotatably supported by brackets 54 which are attached to the metallic base 30. The single operating mechanism 60 is provided for rotating the shaft 50 to move the contact arm 48. The operating mechanism 60 is similar to that described in U.S. Pat. Application Ser. No. 496,800, filed Aug. 12, 1974 by John F. Cotton, Jack G. Hanks, and Raymond E. Wien and assigned to the assignee of the present application. The operating mechanism 60 includes a handle 62, the operation of which causes the operating mechanism 60 to move the contact arms 48 between an open position having the bridging contacts 46 spaced away from the stationary contacts 36 and 40, and a closed position completing a series circuit through the stationary contacts 36, 40 and the bridging contacts 46 as hereinbefore described.

Figure 3:
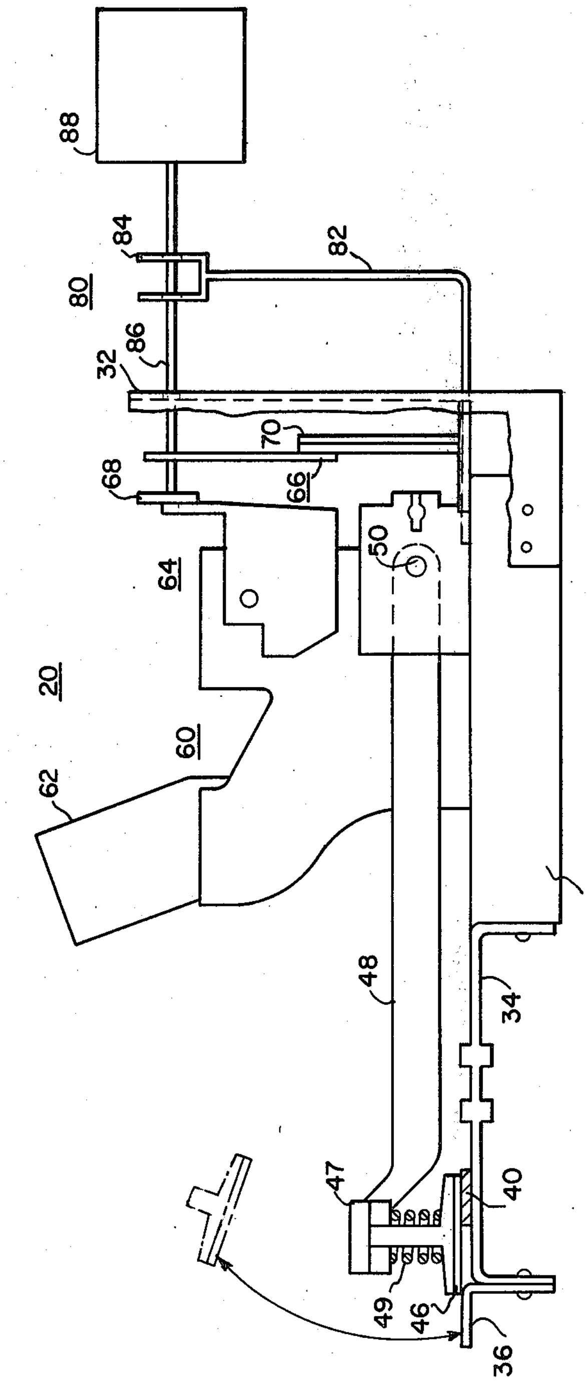
FIG. 3 is a side view of the high voltage disconnect switch shown in FIG. 2.

The switch 20 also includes a trip mechanism 64 attached to the operating mechanism 60. With the switch 20 in the closed position, actuation of the trip mechanism will cause the operating mechanism 60 to automatically rotate the shaft 50, thereby moving the contact arms 48 and interrupting the series circuit through the stationary contacts and bridging contacts 46 with a snap action. The trip mechanism 64 is more completely described in the aforementioned U.S. Patent Application Serial No. 496,800. A bimetal assembly 66, responsive to ambient temperatures surrounding the switch, is mounted upon the base 30 as is shown in FIGS. 2 and 3. The bimetal assembly 66 is on the opposite side of the switch 20 from the current carrying members 36, 40 and 46 and is thus isolated therefrom. The trip mechanism 64 includes a trip bar 68. A generally planar bimetal element 70 is disposed so as to cause the bimetal assembly 66 to contact the trip bar 68 of the trip mechanism 64 when the bimetal element 70 deflects. A rise in temperature of the oil surrounding the bimetal element 70 will cause it to deflect to the left as seen in FIGS. 2 and 3, thereby causing the bimetal assembly 66 to contact the trip bar 68. When the temperature of the oil rises above a predetermined level, the bimetal assembly 66 will deflect the trip bar 68 an amount sufficient to cause the trip mechanism 64 to actuate the operating mechanism 60 and automatically interrupt the series circuit through the contacts 36, 40, 46 as hereinbefore described.

The switch 20 also includes a float mechanism 80, shown most clearly in FIGS. 2 and 3. The float assembly 80 includes a float support 82 attached to the base 30 of the switch 20. The other end of the float support 82 is attached to a bracket 84 through which is inserted a trip rod 86. One end of the trip rod 86 rests upon the trip bar 68 while the other end supports a float 88. The trip rod 86 is slidably supported in the bracket 84 and is free to move in a vertical direction as seen in FIG. 1 (horizontally as seen in FIG. 3). With the switch 20 disposed in the orientation shown in FIG. 1, the weight of the trip rod 86 and float 88 is sufficient to move the trip bar 68, thereby actuating the trip mechanism 64 and causing automatic operation of the switch 20 to the open position, as hereinbefore described. However, as long as the oil within the transformer housing 11 is above a predetermined level, the bouyancy of the float 88 influences the trip rod 86 in an upward direction as seen in FIG. 1, thereby supporting the weight of the float 88 and trip rod 86 and preventing actuation of the trip mechanism 64. Thus, the float assembly 80 insures that an interruption of the high voltage circuit through the contacts 36, 40 and 46 will occur before the oil level drops below the level of the contacts, thereby insuring that an arc will be drawn only when surrounded by insulating oil.

By providing a plurality of stationary contacts and a plurality of bridging contacts for completing a circuit therethrough, the present invention provides for the formation of a multitude of arcs during an opening operation. In this manner, a high voltage can be interrupted with a smaller contact arm travel than if the interruption were accomplished producing only a single arc.

It can be seen therefore that the present invention provides an oil filled distribution transformer including a high voltage disconnect switch which is compact in size. By maximizing the use of metal parts, the cost of the switch is minimized, compared to the use of similar parts formed from molded plastic. The invention provides protection of the transformer through provisions for automatic interruption of the primary circuit upon overtemperature conditions within the transformer and whenever the oil within the housing falls below a predetermined level.

What is claimed is:

1. A high voltage disconnect switch, comprising:

a metal base;

two sets of stationary contacts, each set having first and second contacts;

means for electrically connecting said second contacts;

two movable bridging contacts;

two metal contact arms movable between open and closed positions;

first insulating means outwardly extending from said base in a plane parallel to said base for supporting said stationary contact sets;

second insulating means for supporting each of said bridging contacts upon one of said contact arms; and an operating mechanism attached to said base for operating said contact arms between open and closed positions, each of said bridging contacts connecting first and second contacts of each contact set when said contact arm is in the closed position and being spaced away from said stationary contact sets when said contact arm is in the open position.

2. A high voltage disconnect switch as recited in claim 1 wherein said stationary contact insulating means comprises two insulating arms extending outward from said base, one of said first stationary contacts being connected to the outermost end of each of said insulating arms, and said secondary stationary contacts comprise opposite ends of a conducting bar member extending perpendicular to said insulating arms, each of said bar member ends being attached to one of said insulating arms.

3. A high voltage disconnect switch as recited in claim 2 wherein said insulating arms are constructed of arc-quenching plastic.

4. An oil-filled distribution transformer, comprising:

a housing;

primary and secondary coils supported within said housing;

a high voltage disconnect switch disposed within said housing and connected to said primary coil, said disconnect switch being operable between a closed position permitting current flow through said primary coil and an open position preventing current flow through said primary coil, said switch comprising a metal base, two pairs of stationary contacts, one contact of each pair being interconnected, insulating means extending outward from said base in a plane parallel to said base and supporting said stationary contacts, two bridging contacts each movable between a closed position connecting the contacts of each stationary contact pair and an open position spaced away from said stationary contact pairs, two metal contact arms, each arm supporting one of said bridging contacts, means for insulating said bridging contacts from said contact arms, and an operating mechanism operable to move said contact arms and operate said bridging contact between open and closed positions.

5. An oil-filled distribution transformer as recited in claim 4 wherein said stationary contact insulating means comprise a pair of insulating arms extending outward from said metal base, one of said unconnected stationary contacts being attached to the outermost end of each of said insulating arms, and said interconnected contacts comprise opposite ends of a conducting bar member extending perpendicular to said insulating arms, each of said bar member ends being attached to one of said insulating arms.

6. An oil-filled distribution transformer as recited in claim 5 wherein said insulating arms are constructed of arc-quenching plastic.

7. A distribution transformer, comprising:

an oil-filled housing;

primary and secondary coils disposed within said housing;

a high voltage disconnect switch disposed within said housing, said switch being connected to said primary coil and operable between a closed position permitting current flow through said primary coil and an open position preventing current flow through said primary coil, a mechanism for operating said disconnect switch between open and closed positions, releasable trip means connected to said mechanism and operable upon release to automatically operate said mechanism and move said disconnect switch from the closed to the open position, and bimetal means disposed within said housing isolated from the current path through said switch and responsive to the temperature of the oil, said bimetal means releasing said trip means when the oil temperature rises above a predetermined level.

8. A distribution transformer as recited in claim 7 wherein said temperature responsive means comprise a bimetal element.

9. A distribution transformer as recited in claim 8 wherein said bimetal element is generally planar.

10. A distribution transformer as recited in claim 9 wherein said high voltage disconnect switch comprises a plurality of stationary contacts, a metal base, an insulating means extending outward from said base and supporting said stationary contacts, movable bridging contacts, elongated metal contact arms supporting said bridging contacts and connected to said operating mechanism, said bridging contacts completing and interrupting a circuit through said primary coil when operated between closed and open positions.

* * * * *